US010373331B2

(12) United States Patent
Peng et al.

(10) Patent No.: US 10,373,331 B2
(45) Date of Patent: Aug. 6, 2019

(54) IDENTIFICATION OF A PANTOGRAPH REPRESENTED IN AN IMAGE

(71) Applicant: DTI Group Limited, Western Australia (AU)

(72) Inventors: En Peng, Western Australia (AU); William Hock Oon Lau, Western Australia (AU); Brett Adams, Western Australia (AU)

(73) Assignee: DTI GROUP LIMITED, Western Australia (AU)

( * ) Notice: Subject to any disclaimer, the term of this patent is extended or adjusted under 35 U.S.C. 154(b) by 24 days.

(21) Appl. No.: 15/511,258

(22) PCT Filed: Sep. 15, 2015

(86) PCT No.: PCT/AU2015/050545
§ 371 (c)(1),
(2) Date: Mar. 15, 2017

(87) PCT Pub. No.: WO2016/041007
PCT Pub. Date: Mar. 24, 2016

(65) Prior Publication Data
US 2017/0249750 A1    Aug. 31, 2017

(30) Foreign Application Priority Data
Sep. 15, 2014    (AU) .............................. 2014903664

(51) Int. Cl.
*G06T 7/70*    (2017.01)
*B60L 3/12*    (2006.01)
(Continued)

(52) U.S. Cl.
CPC ................. *G06T 7/70* (2017.01); *B60L 3/12* (2013.01); *B60M 1/28* (2013.01);
(Continued)

(58) Field of Classification Search
CPC ......... B60L 2200/26; B60L 3/12; B60M 1/28; G06K 2209/19; G06K 9/00664;
(Continued)

(56) References Cited

U.S. PATENT DOCUMENTS

2010/0322465 A1* 12/2010 Wesche ..................... B60L 5/24
382/100

FOREIGN PATENT DOCUMENTS

FR    2883962 A1    10/2006
JP    2006349432 A    12/2006

OTHER PUBLICATIONS

International Search Report and Written Opinion for PCT/AU2015/050545 dated Oct. 16, 2015.
(Continued)

*Primary Examiner* — Siamak Harandi
(74) *Attorney, Agent, or Firm* — Pearne & Gordon LLP

(57) ABSTRACT

Pantograph identification methods and devices including computer-implemented methods, software, computer systems for identifying a pantograph of an electric vehicle represented in an image captured by a camera. The method includes, for each pair of adjacent edges represented in the image, determining distances between the adjacent edges, wherein the distances are in a same direction for each of the distances. Then determining a point weight for points of the image associated with the distance by comparing the distance to a value or a value range representing a dimension of the pantograph. Further determining a region of the image that represents the pantograph based on the point weights.

20 Claims, 9 Drawing Sheets

(51) Int. Cl.
  *B60M 1/28* (2006.01)
  *G06T 7/00* (2017.01)
  *G06T 7/13* (2017.01)
  *H04N 7/18* (2006.01)
  *G06K 9/00* (2006.01)
  *G06K 9/46* (2006.01)

(52) U.S. Cl.
  CPC ....... *G06K 9/00664* (2013.01); *G06K 9/4604* (2013.01); *G06T 7/0006* (2013.01); *G06T 7/13* (2017.01); *H04N 7/183* (2013.01); *B60L 2200/26* (2013.01); *G06K 2209/19* (2013.01); *G06T 2207/30136* (2013.01); *G06T 2207/30252* (2013.01)

(58) Field of Classification Search
  CPC ........ G06K 9/4604; G06T 2207/30136; G06T 2207/30252; G06T 7/0006; G06T 7/13; G06T 7/70; H04N 7/183
  See application file for complete search history.

(56) References Cited

OTHER PUBLICATIONS

International Preliminary Report on Patentability for PCT/AU2015/050545 dated Jan. 20, 2017.
Written Opinion for PCT/AU2015/050545 dated Oct. 16, 2015.
Written Opinion of the International Preliminary Examining Authority for PCT/AU2015/050545 dated Jul. 22, 2016.
Halcon, 'Application Guide for HALCON, Version 7.1.4', published on Jul. 31, 2008, [retrieved from internet on Jul. 20, 2016], pp. 25-36.
Landi, A. et al., 'Hough transform and thermo-vision for monitoring pantographcatenary system', Proceedings of the Institution of Mechanical Engineers, Part F: Journal of Rail and Rapid Transit 220.4 (Dec. 2006): 435-447.
Supplementary European Search Report issued in Patent Application No. EP 15 84 2084 dated May 2, 2018.

* cited by examiner

300

410

420

430

440

610

620

630

IDENTIFICATION OF A PANTOGRAPH REPRESENTED IN AN IMAGE

CROSS-REFERENCE TO RELATED APPLICATIONS

The present application claims priority from Australian Provisional Patent Application No 2014903664 filed on 15 Sep. 2014, the content of which is incorporated herein by reference.

TECHNICAL FIELD

The present disclosure generally relates to pantograph identification methods and devices. The present disclosure includes computer-implemented methods, software, computer systems for identifying a pantograph represented in an image.

BACKGROUND

An electric vehicle, for example, an electric train, may have a pantograph installed on the top of the vehicle to contact a power supply line positioned over the electric vehicle. The pantograph introduces electric power from the power supply line to drive the electric vehicle. Sparks may occur around the contact between the pantograph and the power supply line when the vehicle is traveling. These sparks may be due to the contact between the pantograph and the power supply line not being smooth.

The unsmooth contact indicates either the pantograph or the power supply line may have been damaged over time. It is undesirable to operate the electric vehicle with the damaged pantograph or the power supply line as accidents involving the electric vehicle may occur. Therefore, the pantograph may be monitored by a camera capturing images of the pantograph when the electric vehicle is in operation.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present disclosure is not to be taken as an admission that any or all of these matters form part of the prior art base or were common general knowledge in the field relevant to the present disclosure as it existed before the priority date of each claim of this application.

SUMMARY

There is provided a computer-implemented method for identifying a pantograph represented in an image comprised of points, the method comprising:

for each pair of adjacent edges represented in the image, determining a plurality of distances between the adjacent edges, wherein the plurality of distances are in a same direction;

for each of the plurality of distances, determining a point weight for points of the image associated with the distance by comparing the distance to a value or a value range representing a dimension of the pantograph; and determining a region of the image that represents the pantograph based on the point weights.

It is an advantage of the invention that the pantograph represented in the image may be identified fast and accurately.

The computer-implemented method may further comprise storing an indication in a memory to indicate the region of the image.

Determining the point weight for the points of the image associated with the distance may comprise determining a positive point weight for the points associated with the distance if the distance is within the value range, and determining a negative point weight for the points associated with the distance if the distance is outside the value range.

The points associated with the distance may be the points located on or near a line segment that forms the distance between the pair of adjacent edges.

Determining the region of the image based on the point weights may comprise determining a sum of point weights of points in the region of the image is greater than a sum of point weights of points in other regions of the image.

The same direction may be substantially perpendicular to an edge representative of a top of the pantograph represented in the image.

The computer-implemented method may further comprise determining a quantity or proportion of points of the image that have an associated brightness below a first threshold; and if the quantity or proportion of points of the image is greater than a second threshold, aborting the method.

The computer-implemented method may further comprise determining a quantity of edges in the image; and if the quantity of the edges in the image is greater than a third threshold, aborting the method.

The points that the image is comprised of may comprise one or more pixels.

The adjacent edges do not have any edge therebetween.

The region may tightly contain the pantograph represented in the image. For example, the region may be sized to fit substantially the pantograph represented in the image and as few other features of the image as possible.

There is provided a computer software program, including machine-readable instructions, when executed by a processor, causes the processor to perform one or more methods described above.

There is provided a computer system for identifying a pantograph represented in an image comprised of points, the computer system comprising:

a memory to store instructions;

a bus to communicate the instructions from the memory;

a processor to perform the instructions from the memory communicated via the bus for each pair of adjacent edges represented in the images, to determine a plurality of distances between the adjacent edges, where the plurality of distances are in a same direction;

for each of the plurality of distances, to determine a point weight for points of the image between the adjacent edges in the same direction by comparing the distance to a value or a value range representing a dimension of the pantograph; and to determine a region of the image that represents the pantograph based on the point weights.

BRIEF DESCRIPTION OF THE DRAWINGS

Features of the present disclosure are illustrated by way of non-limiting examples, and like numerals indicate like elements, in which.

BEST MODES OF THE INVENTION

Figure 1:
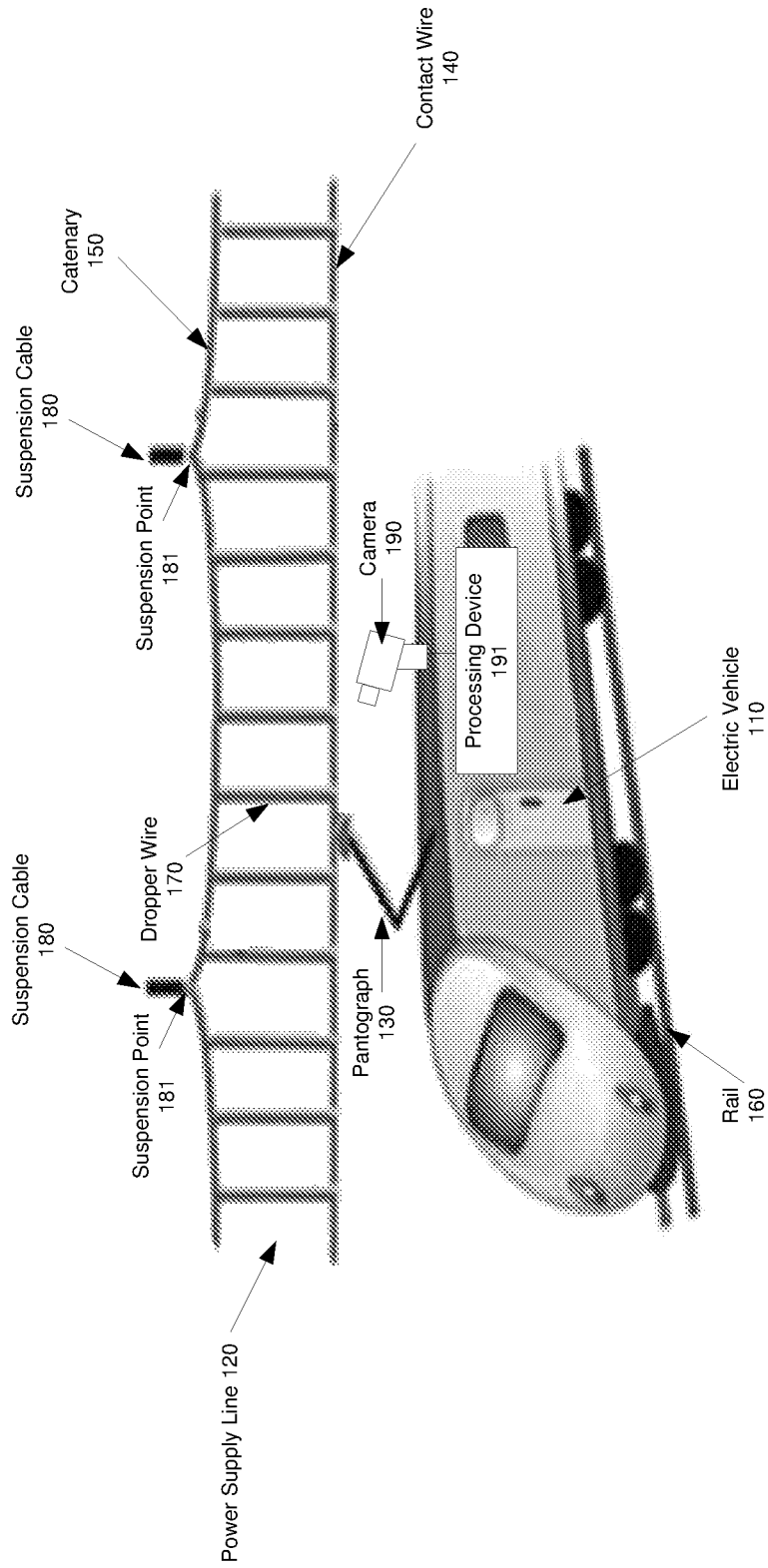
FIG. 1 is an diagram of an example vehicle system according to the present disclosure.

FIG. 1 is an diagram of an example vehicle system 100 according to the present disclosure. The vehicle system 100 comprises an electric vehicle 110 and a power supply line 120. The electric vehicle 110 comprises a pantograph 130. It should be noted that although only one car of the electric vehicle 110 is shown in FIG. 1, the electric vehicle 110 may comprise a plurality of cars.

The power supply line 120 is an overhead power line that is installed over the travel path of the electric vehicle 110. The power supply line 120 comprises a contact wire 140 and a catenary 150.

The contact wire 140 carries electric power and contacts the pantograph 130 of the electric vehicle 110, particularly, the carbon strip part at the top surface of the pantograph 130. The electric power carried on the contact wire 140 is introduced or collected to a driving mechanism of the electric vehicle 110, for example, an electric motor (not shown in FIG. 1), through the pantograph 130 to drive the electric vehicle 110 on rails 160. In other examples, the electric vehicle 110 may travel without use of the rails 160.

To keep the contact wire 140 within defined geometric limits, the catenary 150 is used to support the contact wire 140 from above through dropper wires 170. That is, the contact wire 140 is positioned lower than the catenary 150 in this example.

In FIG. 1, the dropper wires 170 vertically extend between the contact wire 140 and the catenary 150. The dropper wires 170 attach the contact wire 140 and the catenary 150 at specified intervals.

The power supply line 120 is hung over the electric vehicle 110 by suspension cables 180, which may be in turn secured to support mechanisms (not shown in FIG. 1), for example support towers or support poles, which are installed along the travel path. In the example shown in FIG. 1, the suspension cables 180 are attached to the power supply line 120 at suspension points 181.

Figure 4A:
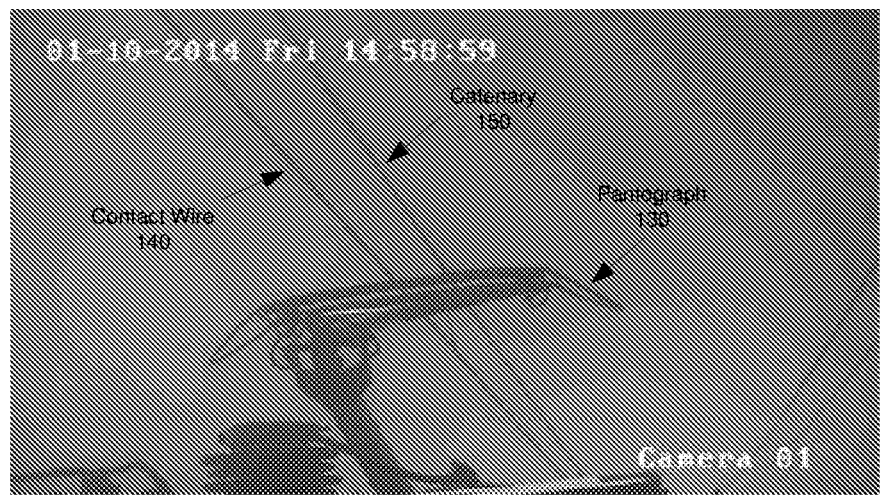
FIG. 4(a) is an example image of a pantograph that is captured by a camera.

A camera 190 is installed on the top of the electric vehicle 110 to monitor the pantograph 130. Specifically, the camera 190 may capture images of the pantograph 130 when the electric vehicle 110 is in operation. The images may be still images and may form part of a video. An example image 410 of the pantograph 130 captured by the camera 190 is shown in FIG. 4(a). The image 410 may be formed by points, which may be one or more pixels of digital images.

The images of the pantograph 130 captured by the camera 190 are sent to a processing device 191 for further analysis to determine operation conditions of the electric vehicle 110.

It should be noted that although the processing device 191 in FIG. 1 is located in the electric vehicle 110, the processing device 191 may also be located remotely from the electric vehicle 110, or both and each processing device 191 can perform part of the method of identifying the pantograph 130. Further, although the pantograph 130 and the camera 190 monitoring the pantograph 130 are installed on the same car of the electric vehicle 110, as shown in FIG. 1, the pantograph 130 and the camera 190 may also be installed on different cars of the electric vehicle 110.

Figure 2:
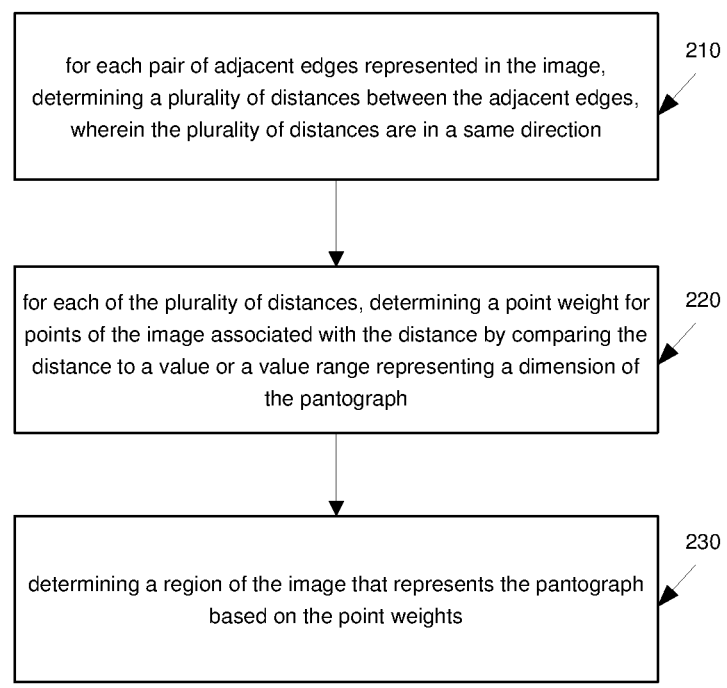
FIG. 2 shows an example method for identifying a pantograph represented in an image according to the present disclosure.
Figure 3:
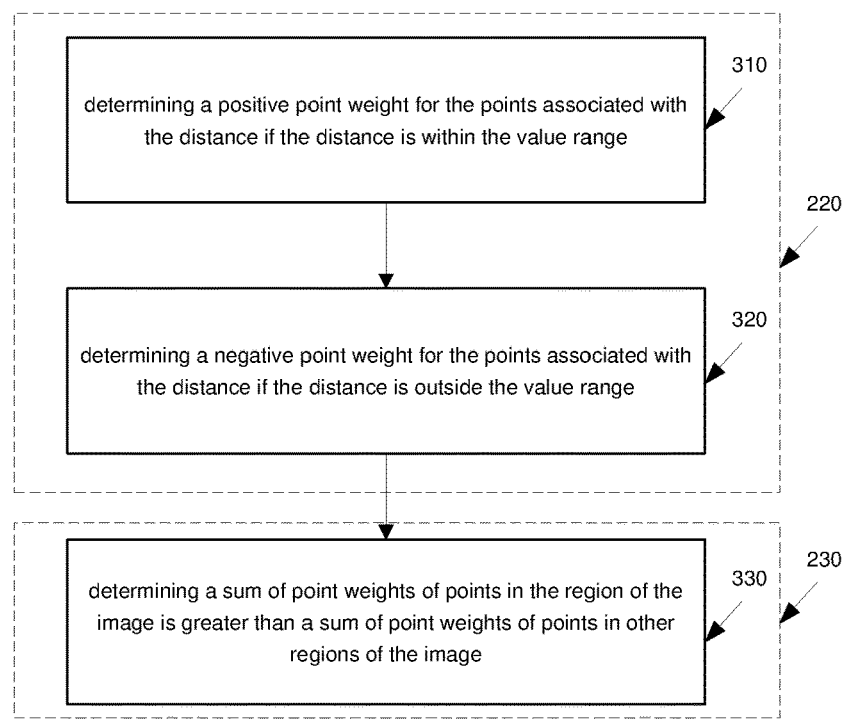
FIG. 3 shows an example method for identifying a pantograph represented in an image according to the present disclosure.

A method for identifying the pantograph 130 represented in the image 410 is described with reference to FIGS. 2 and 3.

Figure 4B:
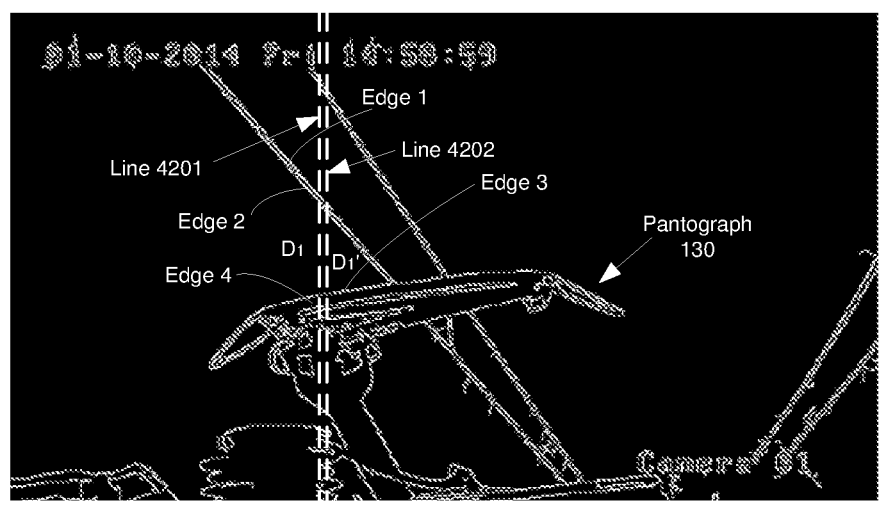
FIG. 4(b) is an example image representative of edges in FIG. 4(a)
Figure 4C:
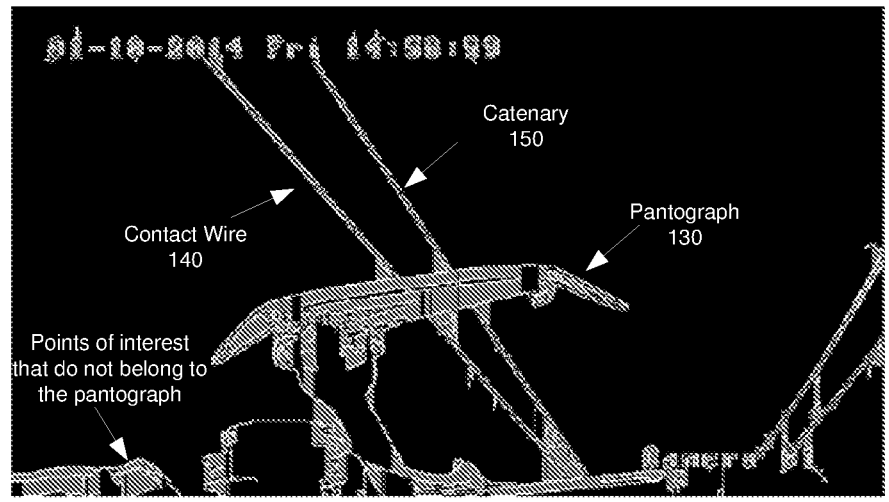
FIG. 4(c) is an example image illustrating points of interest in FIG. 4(b)

Upon receipt of the image 410 from the camera 190, optionally, the processing device 191 extracts edges from the image 410. Specifically, the processing device 191 may use an edge detector for example a Canny edge detector, described in John Canny, "A Computational Approach to Edge Detection," IEEE Transactions on Pattern Analysis and Machine Intelligence, vol. 8, no. 6, pp. 679-698, June 1986, doi:10.1109/TPAMI.1986.4767851, to extract the edges from the image 410. The edges extracted by the edge detector may have single point or pixel width. As a result, an image 420 is generated that is representative of the edges in the image 410, as shown in FIG. 4(b). Alternatively, the image received may already include a representation of the edges in the image and the above edge extracting step is not performed accordingly.

It can be seen from FIG. 4(b) that two edges in the edges in the image 420 may be adjacent edges. Specifically, "adjacent edges" in the present disclosure refer to a pair of edges without any edge therebetween when viewed along a line. Take four edges 1, 2, 3 and 4 shown in FIG. 4(b) as an example, the edges 1 and 2, the edges 2 and 3, the edges 3 and 4 are three pairs of adjacent edges along a line 4201, shown as a dashed line in FIG. 4(b). The line may be a vertical straight line with one-point width. It should be noted that a pair of edges may be adjacent edges when viewed along a line, but the pair of edges may not be adjacent edges when viewed along another line.

An important characteristic of the pantograph 130 in this example is that the pantograph 130 has a horizontal length and a dimension, for example thickness. The dimension substantially does not change along the horizontal length of the pantograph 130. The dimension of the pantograph 130 may be represented by a value range $[D_{min}, D_{max}]$.

The dimension may not necessarily be the actual physical size of the pantograph 130. For example, the dimension may be the size of the pantograph 130 in the image 420, which may be measured by points or pixels which the image 420 is comprised of.

The value range may be pre-determined empirically. The dimension of the pantograph 130 may also be represented by a value based on which the value range is derived. For example, the upper limit of the value range may be 120% of the value, while the lower limit of the value range may be 70% of the value.

The processing device 191 scans the image 420 in the direction of the line 4201 and along the line 4201. In the example shown in FIG. 4(*b*), the line 4201 is a vertical line that is substantially perpendicular to an edge representative of the top of the pantograph 130 represented in the image 420. In this example, the line 4201 is a one-point width line.

The processing device 191 identifies a plurality of pairs of adjacent edges along the line 4201 in the image 420, for example, adjacent edges 1 and 2, 2 and 3, 3 and 4, and determines a distance in the direction of the line 4201 between each of the adjacent edge pairs along the line 4201. For example, the distance between the edges 2 and 3 along the line 4201 is $D_1$.

The processing device 191 repeats the above process but along a different line 4202, which is in the same direction as the line 4201 but is slightly offset from the line 4201. For example, the line 4202 is offset from the line 4201 by the width of the line 4201, which is one point in this example.

As a result, the processing device 191 can determine a distance in the direction of the line 4202, which is the same as the line 4201, between each of the adjacent edge pairs along the line 4202. For example, the distance between the adjacent edges 2 and 3 along the line 4202 is $D_1'$.

In this example, the processing device 191 scans the image 420 along all vertical lines parallel with the lines 4201 and 4202 as described above. These vertical lines may be evenly spaced or may be spaced apart in a way that is not even. This way, for each pair of adjacent edges represented in the image, the processing device 191 can determine 210 a plurality of distances between the adjacent edges in the same direction. In other examples, the scanning process described above may only be performed on a portion of the image 420 in which the pantograph 130 is anticipated to be located in to reduce the computing burden of the processing device 191 and speed up the scanning process.

For each of the plurality of distances between the adjacent edges, the processing device 191 determines 220 a point weight for points of the image associated with the distance by comparing the distance to the value or the value range representing the dimension of the pantograph. In the present disclosure, the points associated with the distance are the points located on or near a line segment that forms the distance between the pair of the adjacent edges.

Take the distances between the adjacent edges 2 and 3 as an example, the processing device 191 compares each of the distances, for example $D_1$ and $D_1'$, with the value range $[D_{min}, D_{max}]$ that represents the thickness of the pantograph 130.

The points associated with the distance $D_1$ are the points located on or near a line segment of the line 4201. One end point of the line segment is the intersection point between the line 4201 and the edge 2, and another end point of the line segment is the intersection point between the line 4201 and the edge 3. The length of the line segment forms the distance between the pair of the adjacent edges 2 and 3 along the line 4201.

Similarly, the points associated with the distance $D_1'$ are the points located on or near a line segment of the line 4202. One end point of the line segment is the intersection point between the line 4202 and the edge 2, and another end point of the line segment is the intersection point between the line 4202 and the edge 3. The length of the line segment forms the distance between the pair of the adjacent edges 2 and 3 along the line 4202.

If the distance is within the value range $[D_{min}, D_{max}]$, the points associated with the distance are identified as points of interest and a positive point weight may be determined 310 for these points. On the other hand, a negative point weight may be determined 320 for these points if the distance is outside the value range $[D_{min}, D_{max}]$. In this example, the positive point weight for the points of interest is +10, and the negative point weight for non-points of interest is −1.

Therefore, the point weight for a point (p) may be expressed by the following equation (1):

$$\text{weight}(p) = \begin{cases} +10, & p \text{ is a point of interest} \\ -1, & \text{otherwise} \end{cases} \quad (1)$$

In the above three pairs of adjacent edges, the distance between the adjacent edges 3 and 4 along the line 4210 is within the value range $[D_{min}, D_{max}]$, while the distance between the adjacent edges 1 and 2 or 2 and 3 is outside the value range $[D_{min}, D_{max}]$. As a result, the points associated with the distance between the adjacent 3 and 4 along the line 4201 are identified as the points of interest and the positive point weight of +10 is assigned to the points, while the negative point weight of −1 is assigned to the points between the adjacent edges 1 and 2 and the adjacent edges 2 and 3.

The processing device 191 may identify all the points of interest and determine the point weighs for all the points in the image 420.

For illustration purposes, an image 430 illustrates the points of interest in the image 420, in which the grey portion represents the points of interest having the point weight of +10, while the black portion represents the non-points of interest having the point weight of −1, as shown in FIG. 4(*c*). As can be seen from FIG. 4(*c*), some of the points of interest belong to points that constitute the pantograph 130. At the same time, some of the points of interest do not belong to the pantograph 130, for example, the points of interests that are located at the bottom-left corner of the image 430.

The processing device 191 then determines 230, based on the point weights for the points in the image 420, a region $R_{optimal}$ of the image 420 that represents the pantograph 130. Specifically, the processing device 191 determines 330 a sum of point weights of points in the region of the image 420 is greater than a sum of point weights of points in other regions of the image 420. The sum of point weights of points in the region $R_{optimal}$ that is acceptable is in an expected range. Preferably, the region is a region that tightly contain the pantograph 130.

To determine the region $R_{optimal}$, a quality function $f(R)$ of an image region R in an image I is defined by the following equation (2):

$$f(R) = \sum_{p \in R} \text{weight}(p) \quad (2)$$

The result of quality function $f(R)$ represents a sum of point weights of the points in the image region R.

The region $R_{optimal}$ may be defined by the following equation (3):

$$R_{optimal} = \sum_{R \subset I} \text{argmax } f(R) \quad (3)$$

That is, the region $R_{optimal}$ represents a region in the image I that has a maximum sum of point weights. The region $R_{optimal}$ may be obtained by applying a sub-window search algorithm for example I-ESS described in An, Senjian An, P. Peursum, Wanquan Liu, S. Venkatesh, "*Efficient algorithms for subwindow search in object detection and localization*" cvpr, pp. 264-271, 2009 IEEE Conference on Computer Vision and Pattern Recognition, 2009.

By applying the equations (2) and (3) to the point weights of points, as illustrated by the image 430, the region $R_{optimal}$ may be obtained, as shown in an image 440 of FIG. 4(*d*). As can be seen from the image 440, the region $R_{optimal}$ contains the pantograph 130 and the boundary of the region $R_{optimal}$, represented by a line box, tightly surrounds the pantograph 130. Therefore, the pantograph 130 is identified.

The processing device 191 then stores an indication to indicate the points in the region $R_{optimal}$. As the region $R_{optimal}$ is bounded by the line box having four corners, as shown in the image 440, positions of the four corners may be used as the indication to indicate the points in the region $R_{optimal}$. The points in the region $R_{optimal}$ may also be indicated in other ways without departing from the scope of the present disclosure.

Figure 5:
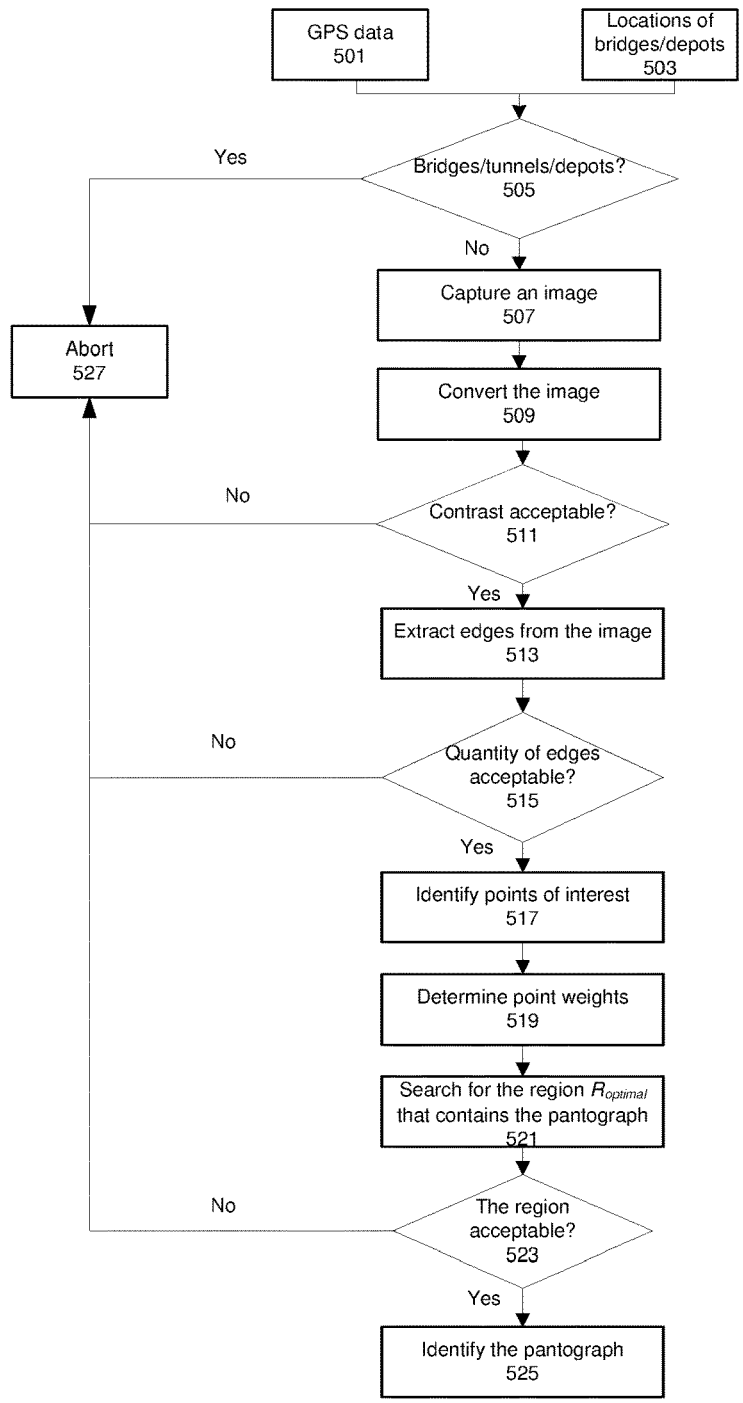
FIG. 5 illustrates an example process for identifying a pantograph represented in an image according to the present disclosure.

FIG. 5 illustrates an example process 500 for identifying a pantograph represented in an image, which may be performed by the processing device 191 shown in FIG. 1.

In practice, the electric vehicle 110 may travel at night or in a dark tunnel, it is thus difficult to extract edges from the images captured by the camera 190 due to the low contrast with the dark background.

Figure 6A:
FIG. 6(a) shows an example image captured when an electric vehicle travels in a dark tunnel.
Figure 6B:
FIG. 6(b) shows an example image captured when the electric vehicle travels under a bridge.
Figure 6C:
FIG. 6(c) shows an example image illustrating edges extracted from the example image shown in FIG. 6(b)

FIG. 6(*a*) shows an example image 610 that is captured by the camera 190 when the electric vehicle 110 travels in a dark tunnel.

It can be seen from the image 610 that the pantograph in the image 610 has very low contrast with the dark background, which makes the pantograph difficult to be identified.

The electric vehicle may also travel under a bridge or pass by a depot. In such a case, the background of the image captured may contain excessive man-made patterns that may appear to be the power supply line 120 or the pantograph 130 when edges are extracted. These patterns are likely to cause false identification of the pantograph 130.

FIG. 6(*b*) shows an example image 620 that is captured by the camera 190 when the electric vehicle 110 travels under a bridge. FIG. 6(*c*) shows an example image 630 that illustrates the edges extracted from the image 620.

It can be seen from the image 630 that the edges of the man-made patterns in the image 620, for example, windows and poles of the bridge, make it difficult to distinguish the pantograph 130 from the image 630.

Therefore, in the process 500, as the electric vehicle 110 travels, the processing device 191 obtains Global Positioning System (GPS) data 501 indicative of the current geographic location of the electric vehicle 110. Meanwhile, the processing device 191 checks a database that includes locations of bridges and depots to determine 505 if the electric vehicle 110 is under a bridge or in a tunnel or a depot. In another example, the GPS data and the database including locations of bridges and depots may not be needed without departing from the scope of the present disclosure.

If the current geographic location of the electric vehicle 110 indicates that the electric vehicle 110 is under a bridge or in a tunnel or a depot, the processing device 191 aborts 527 the process 500 or discard the image that has already been captured.

If it is indicated from the GPS data 501 that the electric vehicle 110 is not under a bridge or in a tunnel or a depot, the processing device 110 may instruct the camera 190 to capture 507 an image or proceed to processing the image that has already been captured by the camera 190.

Additionally or alternatively, the processing device 191 converts 509 the captured image to a grey level image. Before extracting edges from the grey level image, the processing device 191 determines if there is a sufficient contrast 511 between the pantograph and the background in the grey level image.

To do this, the processing device 191 determines a quantity or proportion of points of the image that have an associated brightness below a first threshold. If the quantity or proportion of the points of the image is greater than a second threshold, indicating that the image may be too dark, as shown in FIG. 6(*a*), the processing device 191 aborts 527 the method.

Specifically, the processing device 191 checks the brightness level, for example, the grey level, of a point in the grey level image, if the brightness level of the point is below 20% of the maximum brightness level, indicating the point is a dark point, an counter is increased by one. The processing device 191 may repeat the above procedure for every point in the grey level image. If the resulting counter is greater than 30% of the number of the points in the grey level image, indicating more than 30% percent of the points in the grey level image are dark points, the contrast of the grey level image is not acceptable for further processing, the processing device 191 aborts 527 the process 500.

To improve the processing speed, the processing device 191 may only determine the contrast for part of the grey level image that contains the pantograph, for example, the top half of the grey level image.

In another example, the processing device 191 may calculate the standard deviation of the brightness levels of the points in the grey level image to determine if the contrast of the grey level image is acceptable. Particularly, if the standard deviation is below a threshold, the contrast of the image may not be considered to be acceptable. This way, only one threshold is needed.

If the contrast of the grey level image is acceptable, the processing device 191 extracts 513 edges from the grey level image to generate an image (for example, the image 420 shown in FIG. 4(*b*)) representative of the edges in the grey level image and determines 515 if a quantity of edges in the image is acceptable. If the quantity of the edges in the image is greater than a third threshold, indicating the image may contain excessive edges that may cause false identification of the pantograph, the processing device 191 aborts 527 the process 500.

The quantity of the edges in the image may be represented by the number of points that belong to edges in the image. The third threshold may represent the proportion of edge points in the image. If the proportion of edge points is more than 10% of the total number of points in the image, it is considered that the quantity of edges in the image is not acceptable.

To improve the processing speed, the processing device 191 may only determine the quantity of the edges for part of the image that contains the pantograph, for example, the top half of the image.

If the quantity of edges in the image is acceptable, the processing device identifies 517 points of interest, determines 519 point weights for the points of interest and non-points of interest, and searches 521 for the region $R_{optimal}$ that contains the pantograph 130 according to the methods described with reference to FIGS. 2 and 3.

If the result of the quality function for the region $R_{optimal}$, i.e., the sum of point weights of the points in the region $R_{optimal}$, is in an expected range, the region $R_{optimal}$ is acceptable 523 as a region that contains the pantograph 130.

Figure 4D:
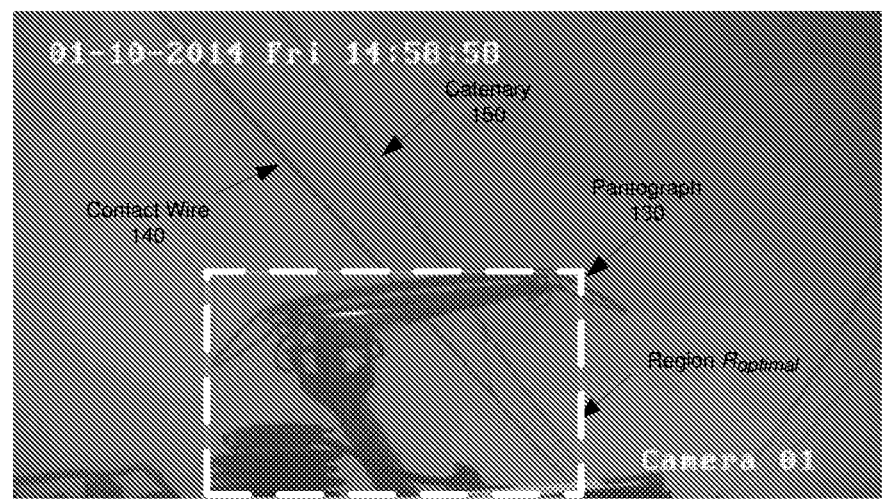
FIG. 4(d) is an example image with an indication indicative of an identified pantograph.

The pantograph 130 is then identified 525 by using for example the line box representing the region $R_{optimal}$, as shown in the image 440 of FIG. 4(d). Otherwise, the processing device 191 aborts 527 the process 500.

To further improve the accuracy of the methods and processes described above, one or more of the following processes may be performed.

Determination of the Value Range Representing the Dimension of the Pantograph

There are two parameters used in the above methods: $D_{min}$ and $D_{max}$. To determine the values of these parameters, two or four reference images are employed depending on the degree of freedom of the pantograph 130 relative to the camera 190 monitoring the pantograph 130.

When the pantograph 130 and the camera 190 are installed on the same car of the electric vehicle 110, the pantograph 130 may substantially only move up and down in the images captured by the camera 190. In this case, two reference images are needed to determine $D_{min}$ and $D_{max}$ with one reference image showing that the pantograph 130 is located at the bottom of the image and the other one showing the pantograph 130 is located at the top of the image.

When the pantograph 130 and the camera 190 are installed on different cars of the electric vehicle 110, the pantograph 130 can move in any direction especially when the electric vehicle 110 is turning. In this case, four reference images are needed to determine $D_{min}$ and $D_{max}$. Each of the four reference images shows the pantograph is located at one of extreme locations, for example, top, bottom, four corners of the images: top left, top right, bottom left and bottom right.

For both scenarios, the pantograph 130, particularly, the carbon strip part, is marked by using a bounding box in each reference image. In each bounding box, an edge detection process is performed to extract edges in the bounding box. Along each column of points in the bounding box, the points are scanned to identified adjacent edges. For each pair of adjacent edges, a distance between the adjacent edges along the column is determined and a vote is placed on a distance bin. In the present disclosure, a distance bin refers to a certain distance range. For example, a distance bin i may refer to a distance range between 2i and 2 (i+1). If a distance is 9, the distance may result in a vote into the distance bin No. 4 since the distance is in the distance range between 2×4=8 and 2×(4+1)=10. As a result, neighbouring distance bins may receive a majority of the votes. Therefore, the value range representing the dimension of the pantograph 130 may be determined according to the distance ranges corresponding to these distance bins.

Fixed Size Sub-Window

In searching for the region $R_{optimal}$ that contains the pantograph 130, a fixed size sub-window may be used in the present disclosure for the sub-window search algorithm to reduce the computing burden of the processing device 191.

For each scenario, since the bounding boxes for the reference images may represent the extreme sizes, i.e., the maximum size and the minimum size, of the pantograph 130, the size of the largest bounding box may be used as the size of the fixed size sub-window.

As a result, the sub-window search algorithm may be performed with the fixed size sub-window, and can be completed with less computing capabilities and within less time.

Reduction of the Search Space

Figure 8A:
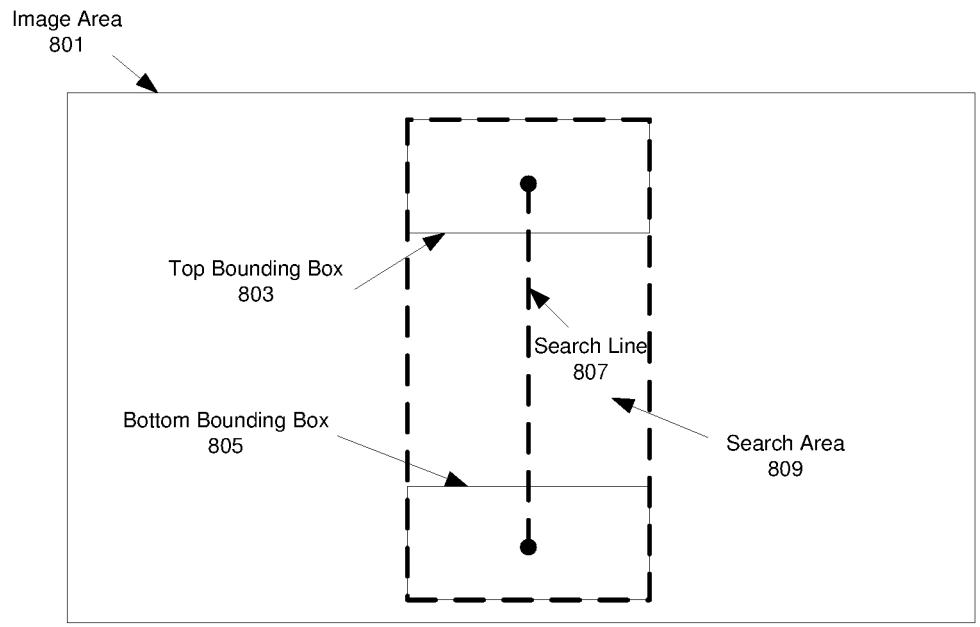
FIGS. 8(a) and (b) illustrate examples of reducing a search space for the pantograph represented in an image.

In searching for the region $R_{optimal}$ that contains the pantograph 130, the search space for the sub-window search algorithm may be the entire image 420, shown as an image area 801 in FIGS. 8(a) and (b).

In the present disclosure, the search space may be reduced based on the location of the pantograph 130 in the image area 801. As described above, the location of the pantograph 130 may include extreme locations in the image area 801, for example, top, bottom, four corners of the image area 801: top left, top right, bottom left and bottom right.

As shown in FIG. 8(a), in the scenario where the pantograph 130 and the camera 190 are installed on the same car of the electric vehicle 110, as described above, since the pantograph 130 may substantially only move vertically in relation to the camera 190, the two reference images show that the pantograph 130 is located at the top and bottom of the image area 801, represented by a top bounding box 803 and a bottom bounding box 805 in the image area 801. These bounding boxes 803, 805 are indicated by the solid line boxes in FIG. 8(a).

If a fixed size sub-window is used, the search space may be reduced to a line segment between the locations of the centres of the bounding boxes 803, 805, shown as a search line 807 in FIG. 8(a), and the search may be performed on the search line.

On the other hand, if the size of sub-window is not fixed, the search space may be reduced to an area defined the extreme locations of the pantograph 130. In this example, the reduced search space may be a search area 809 tightly enclosing the extreme locations of the pantograph 130, indicated by the dash line box in FIG. 8(a).

Figure 8B:
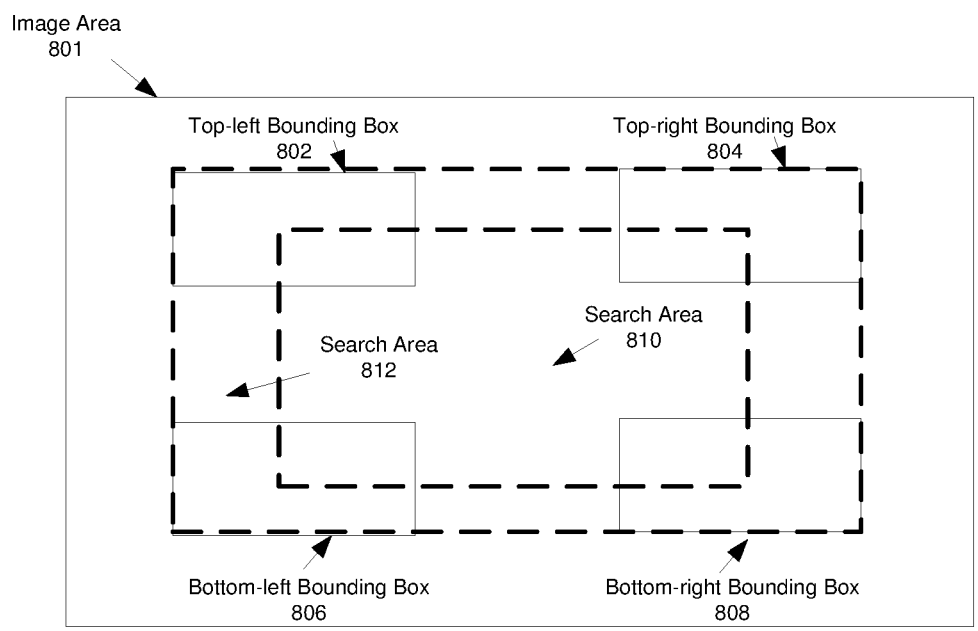

As shown in FIG. 8(b), in the scenario where the pantograph 130 and the camera 190 are installed on different cars of the electric vehicle 110, the four reference images show that the pantograph 130 is located at the top left, top right, bottom left and bottom right of the image area 801, represented by a top-left bounding box 802, a top-right bounding box 804, a bottom-left bounding box 806 and a bottom-right bounding box 808.

If a fixed size sub-window is used, the search space may be reduced to a search area 810 that is bounded by the centre locations of the four bounding boxes 802, 804, 806, 808, indicated by the inner dash line box in FIG. 8(b).

On the other hand, if the size of sub-window is not fixed, the search space may be reduced to a search area 812 tightly enclosing the extreme locations of the pantograph 130, indicated by the outer dash line box in FIG. 8(b).

This way, the processing device 191 may search the reduced search space for the region $R_{optimal}$. As a result, the sub-window search algorithm may be performed within the reduced search space, and can be completed with less computing capabilities and within less time.

Acceptance of the Region $R_{optimal}$

As described with reference to the step 525 of the process 500 shown in FIG. 5, the region $R_{optimal}$ is acceptable as the region that contains the pantograph 130 if the result of the quality function for the region $R_{optimal}$ is in the expected range.

For each scenario, since the bounding boxes for the reference images may represent the extreme conditions of the region $R_{optimal}$, the results of the quality functions for the bounding boxes may be used as the basis of the expected range that the sum of point weights of the points in the region $R_{optimal}$ is in.

For example, the upper limit of the expected range may be the maximum value in the results of the quality functions for the bounding boxes, while the lower limit of the expected range may be the minimum value in the results. In practice, the upper/lower limit of the expected range may be relaxed for robustness without departing from the scope of the present disclosure.

Figure 7:
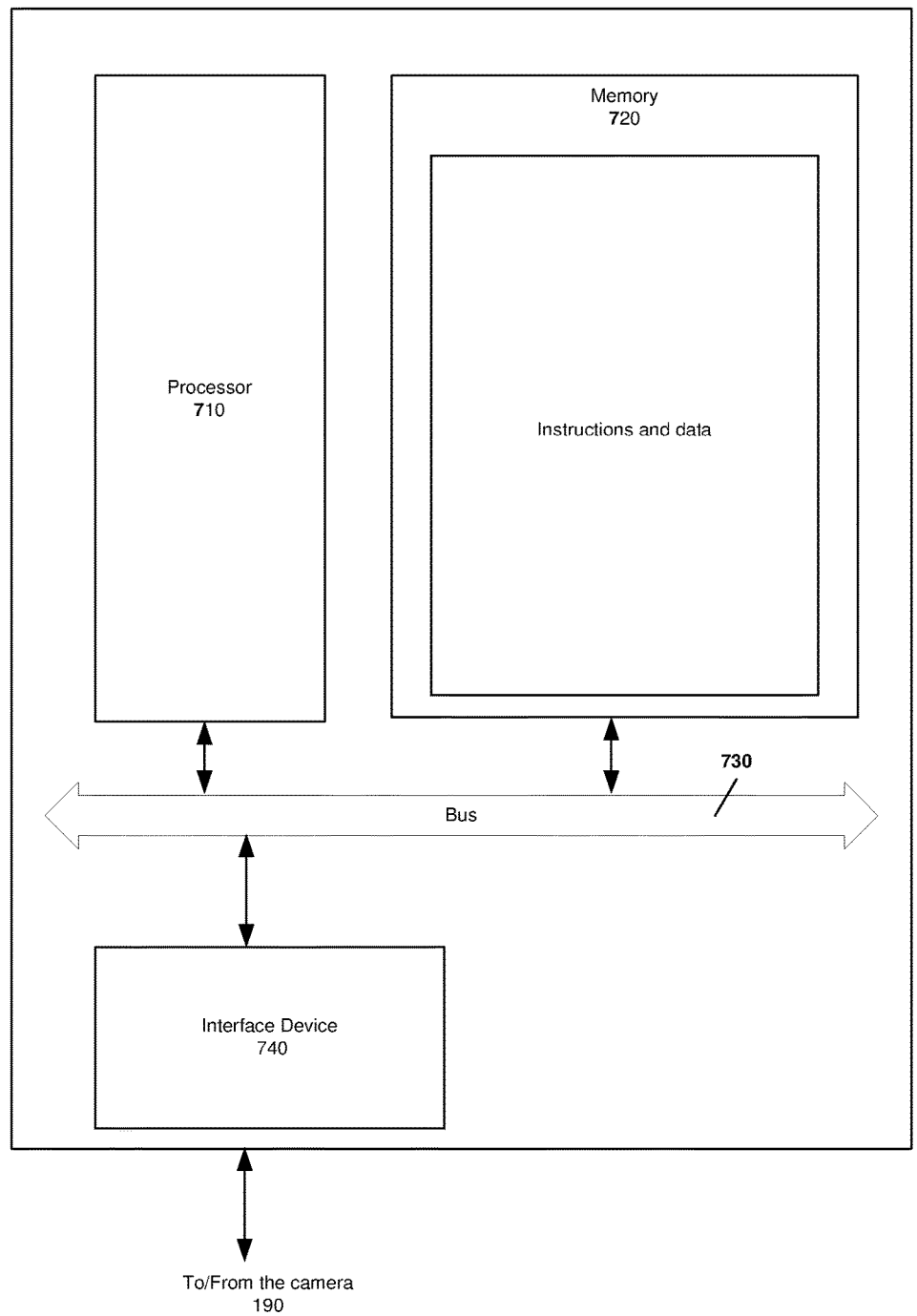
FIG. 7 is an example processing device for identifying a pantograph represented in an image according to the present disclosure.

FIG. 7 illustrates an example processing device 191 according to present disclosure.

The processing device 191 includes a processor 710, a memory 720 and an interface device 740 that communicate with each other via a bus 730. The memory 720 stores instructions and data for the methods and processes described above, and the processor 710 performs the instructions from the memory 720 to implement the methods and processes. It should be noted that although the processing device 191 is shown as an independent entity in FIG. 1, the processing device 191 may also be part of another entity for example the camera 190.

The processor 710 may perform the instructions from the memory 720 communicated via the bus 730
    for each pair of adjacent edges represented in the images, to determine a plurality of distances between the adjacent edges, where the plurality of distances are in a same direction;
    for each of the plurality of distances, to determine a point weight for points of the image between the adjacent edges in the same direction by comparing the distance to a value or a value range representing a dimension of the pantograph; and
    to determine a region of the image that represents the pantograph based on the point weights.

The processor 710 may also perform other methods and processes described above with reference to the accompanying drawings.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Example carrier waves may take the form of electrical, electromagnetic or optical signals conveying digital data streams along a local network or a publically accessible network such as the Internet.

It should also be understood that, unless specifically stated otherwise as apparent from the following discussion, it is appreciated that throughout the description, discussions utilizing terms such as "obtaining" or "determining" or "sending" or "receiving" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method for identifying a pantograph represented in an image comprised of points, the method comprising:
    for each pair of adjacent edges represented in the image, determining a plurality of distances between the adjacent edges, wherein the plurality of distances are in a same direction;
    for each of the plurality of distances, determining a point weight for points of the image associated with the distance by comparing the distance to a value or a value range representing a dimension of the pantograph; and
    determining a region of the image that represents the pantograph based on the point weights.

2. The computer-implemented method according to claim 1, further comprising:
    storing an indication in a memory to indicate the region of the image.

3. The computer-implemented method according to claim 1, wherein determining the point weight for the points of the image associated with the distance comprises:
    determining a positive point weight for the points associated with the distance if the distance is within the value range; and
    determining a negative point weight for the points associated with the distance if the distance is outside the value range.

4. The computer-implemented method according to claim 1, wherein the points associated with the distance are the points located on or near a line segment that forms the distance between the pair of adjacent edges.

5. The computer-implemented method according to claim 1, wherein determining the region of the image based on the point weights comprises:
    determining a sum of point weights of points in the region of the image is greater than a sum of point weights of points in other regions of the image.

6. The computer-implemented method according to claim 1, wherein the same direction is substantially perpendicular to an edge representative of a top of the pantograph represented in the image.

7. The computer-implemented method according to claim 1, further comprising:
    determining a quantity or proportion of points of the image that have an associated brightness below a first threshold; and
    if the quantity or proportion of points of the image is greater than a second threshold, aborting the method.

8. The computer-implemented method according to claim 1, further comprising:
    determining a quantity of edges in the image; and
    if the quantity of the edges in the image is greater than a third threshold, aborting the method.

9. The computer-implemented method according to claim 1, wherein the points that the image is comprised of comprise one or more pixels.

10. The computer-implemented method according to claim 1, wherein the adjacent edges do not have any edge therebetween.

11. The computer-implemented method according to claim 1, wherein the region tightly contains the pantograph represented in the image.

12. A computer software program stored on a non-transitory medium, including machine-readable instructions, when executed by a processor, causes the processor to perform the method of claim 1.

13. A computer system for identifying a pantograph represented in an image comprised of points, the computer system comprising:
a memory to store instructions;
a bus to communicate the instructions from the memory;
a processor to perform the instructions from the memory communicated via the bus
for each pair of adjacent edges represented in the images, to determine a plurality of distances between the adjacent edges, where the plurality of distances are in a same direction;
for each of the plurality of distances, to determine a point weight for points of the image between the adjacent edges in the same direction by comparing the distance to a value or a value range representing a dimension of the pantograph; and
to determine a region of the image that represents the pantograph based on the point weights.

14. The computer-implemented method according to claim 1, further including determining a change in the region of the image that represents the pantograph.

15. The computer-implemented method according to claim 14, wherein the change is determined based on a comparison to an expected range of point weights, and wherein a deviation from the expected range indicates a damaged condition of the pantograph.

16. The computer-implemented method according to claim 14, wherein the change is determined based on comparison to a prior recorded region of the image that represents the pantograph, and wherein a deviation from the prior recorded region indicates a damaged condition of the pantograph.

17. The computer-implemented method according to claim 1, further including determining presence of sparks around the region of the image that represents the pantograph, wherein a presence of sparks indicates a damaged condition of the pantograph or of a power supply line engaged by the pantograph.

18. A computer-implemented method for determining a condition of a pantograph, the method comprising:
for each pair of adjacent edges represented in the image, determining a plurality of distances between the adjacent edges, wherein the plurality of distances are in a same direction;
for each of the plurality of distances, determining a point weight for points of the image associated with the distance by comparing the distance to a value or a value range representing a dimension of the pantograph;
determining a region of the image that represents the pantograph based on the point weights; and
comparing the region of the image that represents the pantograph to at least one of an expected range of point weights or a prior recorded region of the image that represents the pantograph, wherein a deviation from the expected range or from the prior recorded region indicates a damaged condition of the pantograph.

19. The computer-implemented method of claim 18, wherein the expected range is a range of a sum of point weights of points in the region of the image that represents the pantograph that is pre-determined to be acceptable.

20. The computer-implemented method according to claim 18, further including determining presence of sparks around the region of the image that represents the pantograph, wherein a presence of sparks indicates a damaged condition of the pantograph or of a power supply line engaged by the pantograph.

* * * * *